US012676097B2

(12) United States Patent
Hayashi et al.

(10) Patent No.: US 12,676,097 B2
(45) Date of Patent: Jul. 7, 2026

(54) DISPLAY APPARATUS AND DISPLAY SYSTEM

(71) Applicant: Sharp Display Technology Corporation, Kameyama City (JP)

(72) Inventors: Tatsuya Hayashi, Kameyama City (JP); Kohji Saitoh, Kameyama City (JP); Kazuhisa Yoshimoto, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 18/777,609

(22) Filed: Jul. 19, 2024

(65) Prior Publication Data

US 2025/0029540 A1 Jan. 23, 2025

(30) Foreign Application Priority Data

Jul. 21, 2023 (JP) ................................ 2023-119440

(51) Int. Cl.
*G09G 3/20* (2006.01)

(52) U.S. Cl.
CPC ... *G09G 3/2092* (2013.01); *G09G 2310/0289* (2013.01); *G09G 2310/08* (2013.01); *G09G 2330/023* (2013.01)

(58) Field of Classification Search
CPC ......... G09G 3/2092; G09G 2310/0289; G09G 2310/08; G09G 2330/023; G09G 3/20
See application file for complete search history.

(56) References Cited

U.S. PATENT DOCUMENTS

| | | | | |
|---|---|---|---|---|
| 11,244,654 | B2 | 2/2022 | Sinha et al. | |
| 11,635,841 | B1 * | 4/2023 | Kim | G06F 3/04166 345/173 |
| 11,783,768 | B2 * | 10/2023 | Baek | G09G 3/3208 345/212 |
| 11,829,553 | B2 * | 11/2023 | Xiao | G06F 3/04166 |
| 2004/0228265 | A1 | 11/2004 | Ota | |
| 2006/0152460 | A1 | 7/2006 | Toyozawa et al. | |
| 2007/0273682 | A1 * | 11/2007 | Yi | G09G 3/3611 345/211 |
| 2008/0239229 | A1 * | 10/2008 | Park | G09G 5/003 349/149 |

(Continued)

FOREIGN PATENT DOCUMENTS

| | | | |
|---|---|---|---|
| JP | 2004-226787 | A | 8/2004 |
| JP | 2004-287164 | A | 10/2004 |

(Continued)

*Primary Examiner* — Jose R Soto Lopez
(74) *Attorney, Agent, or Firm* — ScienBiziP, P.C.

(57) ABSTRACT

A display apparatus includes a power control circuit and a timing control circuit that supplies a timing signal to a level shifter circuit. In response to reception of a control signal used to transition from a display mode to a pause mode from a host controller, the timing control circuit causes the level shifter circuit to stop outputting a gate signal by transmitting a pause signal to the power control circuit and stopping supplying the timing signal to the level shifter circuit. In response to reception of the pause signal, the power control circuit stops supplying at least part of power to be supplied to the display panel and the level shifter circuit while keeping supplying power to the timing control circuit.

2 Claims, 8 Drawing Sheets

(56) References Cited

U.S. PATENT DOCUMENTS

| | | | | |
|---|---|---|---|---|
| 2011/0057914 | A1* | 3/2011 | Nam | G09G 3/3648 345/211 |
| 2012/0056864 | A1* | 3/2012 | Aioanei | G09G 3/3696 345/212 |
| 2012/0056870 | A1* | 3/2012 | Koh | G09G 3/3688 345/215 |
| 2012/0133635 | A1* | 5/2012 | Ji | G09G 3/3688 345/212 |
| 2013/0120343 | A1* | 5/2013 | Ahn | G09G 1/005 345/211 |
| 2014/0022234 | A1* | 1/2014 | Ogawa | G09G 3/3618 345/87 |
| 2014/0191935 | A1 | 7/2014 | Morii et al. | |
| 2015/0054801 | A1 | 2/2015 | Seo et al. | |
| 2015/0106759 | A1* | 4/2015 | Ryo | G06F 1/3218 715/781 |
| 2015/0262541 | A1* | 9/2015 | Lai | G09G 3/3611 345/212 |
| 2016/0035306 | A1* | 2/2016 | Park | G09G 3/3648 345/212 |
| 2016/0104450 | A1* | 4/2016 | Lee | G09G 3/3688 345/211 |
| 2016/0133179 | A1* | 5/2016 | Choi | G09G 3/2092 345/212 |
| 2016/0188142 | A1* | 6/2016 | Oh | G06F 1/3265 345/87 |
| 2016/0225327 | A1* | 8/2016 | Jang | G09G 3/3413 |
| 2017/0131829 | A1 | 5/2017 | Takahashi et al. | |
| 2018/0053463 | A1* | 2/2018 | Kong | G09G 3/20 |
| 2018/0374443 | A1* | 12/2018 | Kuei | G09G 3/3611 |
| 2019/0107883 | A1* | 4/2019 | Ma | G09G 5/18 |
| 2019/0121476 | A1* | 4/2019 | Jang | G09G 3/20 |
| 2019/0197979 | A1* | 6/2019 | Kim | G09G 3/3685 |
| 2020/0027381 | A1* | 1/2020 | Hashimoto | G09G 3/006 |
| 2020/0150475 | A1 | 5/2020 | Ueyama et al. | |
| 2020/0193889 | A1* | 6/2020 | Bang | G09G 3/006 |
| 2021/0280121 | A1* | 9/2021 | Nam | G09G 3/3696 |
| 2021/0335179 | A1* | 10/2021 | Zhu | G09G 3/2092 |
| 2022/0157214 | A1* | 5/2022 | Gao | G09G 5/001 |
| 2022/0415241 | A1* | 12/2022 | Yoon | G06F 1/3296 |
| 2024/0004496 | A1* | 1/2024 | Yoon | G06F 3/0412 |
| 2024/0221594 | A1* | 7/2024 | Kim | G09G 3/2007 |
| 2024/0257680 | A1* | 8/2024 | Choi | G09G 3/3291 |
| 2025/0022400 | A1* | 1/2025 | Wang | G09G 3/20 |

FOREIGN PATENT DOCUMENTS

| | | | |
|---|---|---|---|
| JP | 2017-091224 | A | 5/2017 |
| KR | 10-2020-0082385 | A | 7/2020 |
| WO | 2013/021930 | A1 | 2/2013 |
| WO | 2018/230452 | A1 | 12/2018 |
| WO | 2021/117640 | A1 | 6/2021 |

* cited by examiner

DISPLAY APPARATUS AND DISPLAY SYSTEM

BACKGROUND

1. Field

The present disclosure relates to a display apparatus and a display system.

2. Description of the Related Art

The display apparatus disclosed in Japanese Unexamined Patent Application Publication No. 2017-91224 performs a control operation in a normal operation mode that displays an image on a display panel or in a sleep mode that does not display images on the display panel. The display apparatus is designed to transition to the sleep mode if no touching operation is performed in the normal operation mode for a predetermined period of time. The display apparatus is also designed to transition to the normal operation mode if the touching operation is performed in the sleep mode. Since the display apparatus does not display images on a display panel in the sleep mode, a display controller, a gate driver and a source driver are suspended in operation.

When the sleep mode (pause mode) is transitioned to the normal operation mode (display mode) in the display apparatus disclosed in Japanese Unexamined Patent Application Publication No. 2017-91224, the display apparatus of the related art takes a longer time from detecting the touching operation (receiving a detection signal of the touching operation) until displaying an image on the display panel. Specifically, the display apparatus of the related art takes a longer time from receiving a control signal used to transition from the pause mode to the display mode until displaying an image on the display panel.

It is desirable to provide a display apparatus and a display system that may reduce time from when the control signal used to transition from the pause mode to the display mode to when an image is displayed on the display panel.

SUMMARY

According to a first aspect of the disclosure, there is provided a display apparatus including: a display panel; a display driving circuit that supplies the display panel with a driving signal; a timing control circuit that supplies the display panel with an image signal and the display driving circuit with a timing signal; and a power control circuit that controls a power-on state and a power-off state on each of the display panel, the display driving circuit and the timing control circuit, wherein in response to reception of a control signal from a host controller with the control signal used to transition the display panel from a display mode causing the display panel to perform displaying to a pause mode causing the display panel to stop displaying, the timing control circuit transmits a pause signal to the power control circuit and causes the display driving circuit to stop supplying the driving signal to the display panel by stopping supplying the timing signal to the display driving circuit, wherein in response to reception of the pause signal, the power control circuit stops supplying at least part of power to be supplied to the display panel and the display driving circuit while keeping supplying power to the timing control circuit, and wherein in response to the reception of the control signal used to transition from the display mode to the pause mode from the host controller, the timing control circuit stops transmitting the pause signal to the power control circuit and supplies the display driving circuit with the timing signal.

According to a second aspect of the disclosure, there is provided a display system including: a display apparatus including a display panel; and a host controller that transmits a first control signal and a second control signal to the display apparatus with the first control signal used to transition the display panel from a display mode causing the display panel to perform displaying to a pause mode causing the display panel to stop displaying and with the second control signal used to transition the display panel from the pause mode to the display mode; wherein the display apparatus includes: a display driving circuit that supplies the display panel with a driving signal; a timing control circuit that supplies the display panel with an image signal and the display driving circuit with a timing signal; and a power control circuit that controls a power-on state and a power-off state on each of the display panel, the display driving circuit and the timing control circuit, wherein the timing control circuit receives the first control signal from the host controller, transmits a pause signal to the power control circuit, and causes the display driving circuit to stop supplying the driving signal to the display panel by stopping supplying the timing signal to the display driving circuit, wherein in response to reception of the pause signal, the power control circuit stops supplying at least part of power to be supplied to the display panel and the display driving circuit while keeping supplying power to the timing control circuit, and wherein in response to reception of the second control signal from the host controller, the timing control circuit stops transmitting the pause signal to the power control circuit and supplies the display driving circuit with the timing signal.

DESCRIPTION OF THE EMBODIMENTS

Figure 1:
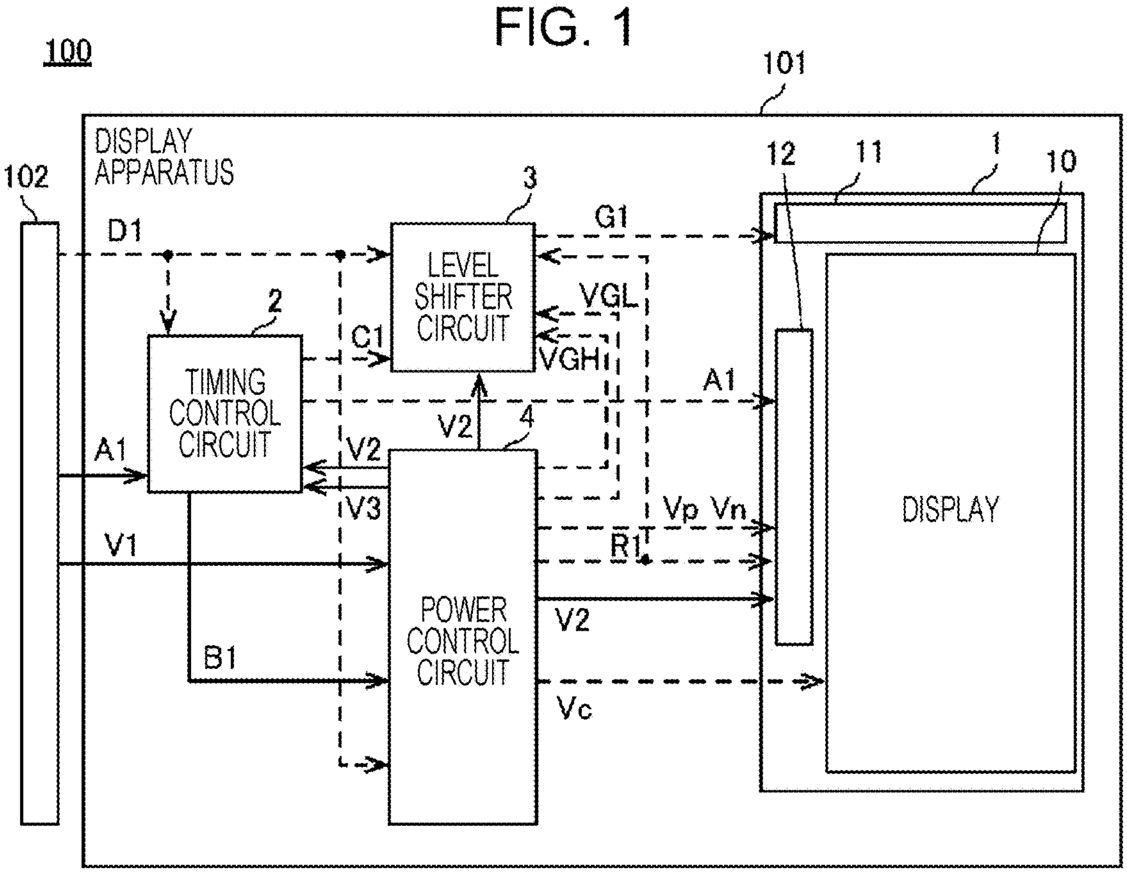
FIG. 1 is a block diagram of a display system of a first embodiment.

Embodiments of the disclosure are described with reference to the drawings. The disclosure is not limited to the embodiments described below. The embodiments may be appropriately modified without departing from the scope of the disclosure. In the discussion that follows, like elements or elements having the same function are designated with the same reference numerals throughout different drawings and the discussion thereof are not repeated. Configurations in the embodiments and modifications of the embodiments may be combined or changed without departing from the scope of the disclosure. For easier understanding, the configurations may be simplified or clarified in the drawings, and some of components in each configuration may be omitted.

First Embodiment

Whole Configuration of Display Apparatus

FIG. 1 is a block diagram of a display system 100 of a first embodiment. The display system 100 includes a display apparatus 101 and a host controller 102. The display system 100 may be a personal computer, a tablet terminal, a smart phone or a television device. The host controller 102 transmits to the display apparatus 101 not only an image signal (video signal) A1 but also a control signal D1. The host controller 102 is connected to the display apparatus 101 via an I2C bus and performs serial communication with the display apparatus 101. The display apparatus 101 displays an image in response to the image signal A1 from the host controller 102.

The control signal D1 includes a signal that commands a display panel 1 of the display apparatus 101 to transition from a display mode causing the display panel 1 to perform displaying to a pause mode causing the display panel 1 to stop displaying. For example, if no input is entered by a user for a specific period of time in the middle of a control operation in the display mode or the user is not present within a shooting range of a camera (not illustrated), the host controller 102 transmits the control signal D1 including the signal used to transition from the display mode to the pause mode. If an input is entered by the user in the middle of the control operation in the pause mode or the user appears within the shooting range of the camera, the host controller 102 transmits the control signal D1 including the signal used to transition from the pause mode to the display mode. According to the first embodiment, the host controller 102 supplies a power control circuit 4 with a voltage V1 regardless of whether the control operation is performed in the display mode or the pause mode.

The pause mode is a state in which the display panel 1 is caused to pause or stop displaying to reduce power consumption. The stopping of the displaying of the display panel 1 in the pause mode continues until the mode is transitioned to the display mode (the displaying is stopped across multiple frames). The stopping of the displaying signifies that the supply of signals (a gate signal and a gate driving signal) from a gate driving circuit 11 and a source driving circuit 12 to a display 10 is stopped in the display panel 1. The display mode is a state in which an image is displayed on the display panel 1 by supplying the signals (the gate signal and the gate driving signal) from the gate driving circuit 11 and the source driving circuit 12 to the display 10. Transmission of signals and supply of power denoted by arrow-headed broken lines in FIGS. 1, 4, 5, 8 and 9 are performed only in the display mode. The transmission of signals and the supply of power denoted by arrow-headed solid lines in FIGS. 1, 4, 5, 8 and 9 are performed in both the display mode and the pause mode.

Configuration of Display Apparatus

As illustrated in FIG. 1, the display apparatus 101 includes a display panel 1, a timing control circuit 2, a level shifter circuit 3 and a power control circuit 4. The level shifter circuit 3 is an example of a "display driving circuit" in the disclosure.

Configuration of Display Panel

Figure 2:
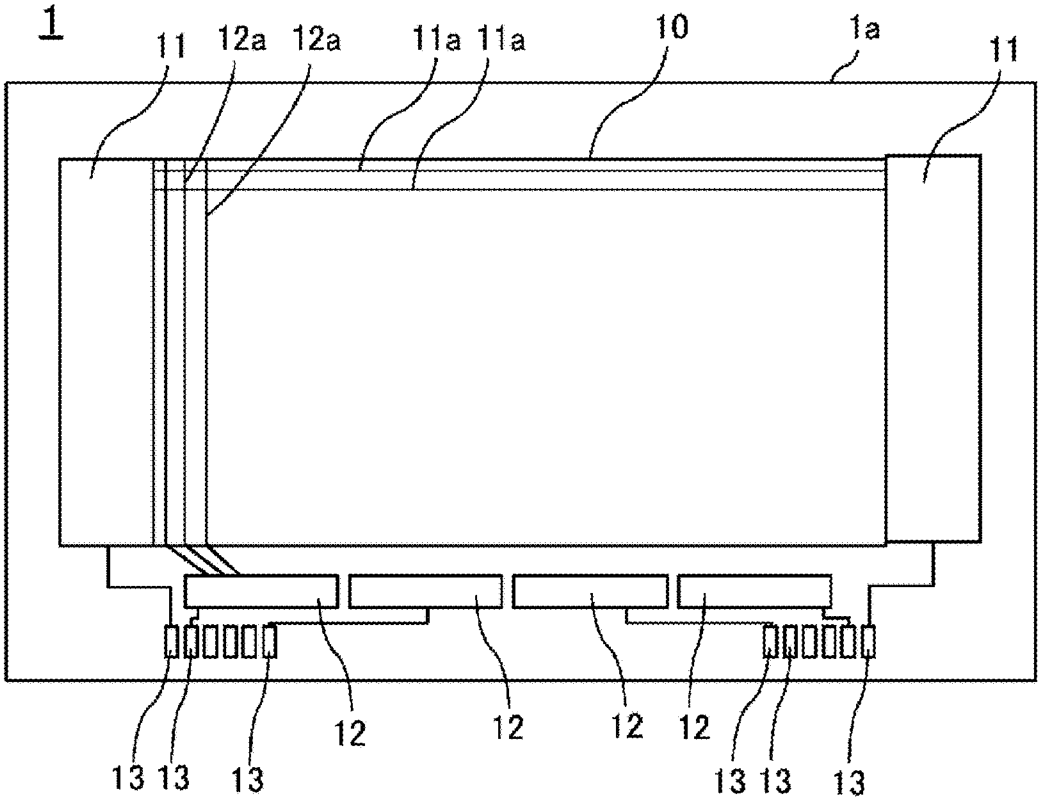
FIG. 2 schematically illustrates a configuration of a display panel.

FIG. 2 schematically illustrates the configuration of the display panel 1. The display panel 1 displays images. For example, the display panel 1 may be a liquid-crystal display panel, an organic electroluminescent (EL) panel or a micro-light-emitting-diode (LED) panel. Referring to FIG. 2, the display panel 1 includes the display 10, the gate driving circuit 11 and the source driving circuit 12. The display panel 1 includes a substrate 1*a* that includes multiple gate lines 11*a*, multiple source lines 12*a* and multiple terminals 13 formed thereon. The gate lines 11*a* intersect the source lines 12*a* in a plan view. The display 10 is a region of the substrate 1*a* that has pixels 10*a* (see FIG. 3) formed thereon and displays images.

The gate driving circuit 11 successively supplies the gate lines 11*a* with a gate signal G1 from the level shifter circuit 3. The gate driving circuit 11 is a gate driver monolithic (GDM) circuit that is monolithically formed on the substrate 1*a*.

The source driving circuit 12 is supplied with an image signal A1 (digital signal) from the timing control circuit 2. The source driving circuit 12 is supplied from the power control circuit 4 with a positive voltage Vp, a negative voltage Vn and a reset signal R1. Using the positive voltage Vp and the negative voltage Vn, the source driving circuit 12 generates a source signal in response to the image signal A1 (digital signal). The source driving circuit 12 supplies the source signal to the source lines 12*a*. The source driving circuit 12 is an integrated circuit mounted on the substrate 1*a*.

The terminals 13 are connected to a flexible printed circuit board (not illustrated). The terminals 13 are connected to the timing control circuit 2, the level shifter circuit 3 and the power control circuit 4 via the flexible printed circuit board. The terminals 13 are also connected to the gate driving circuit 11, the source driving circuit 12 and a common electrode wiring (not illustrated).

Figure 3:
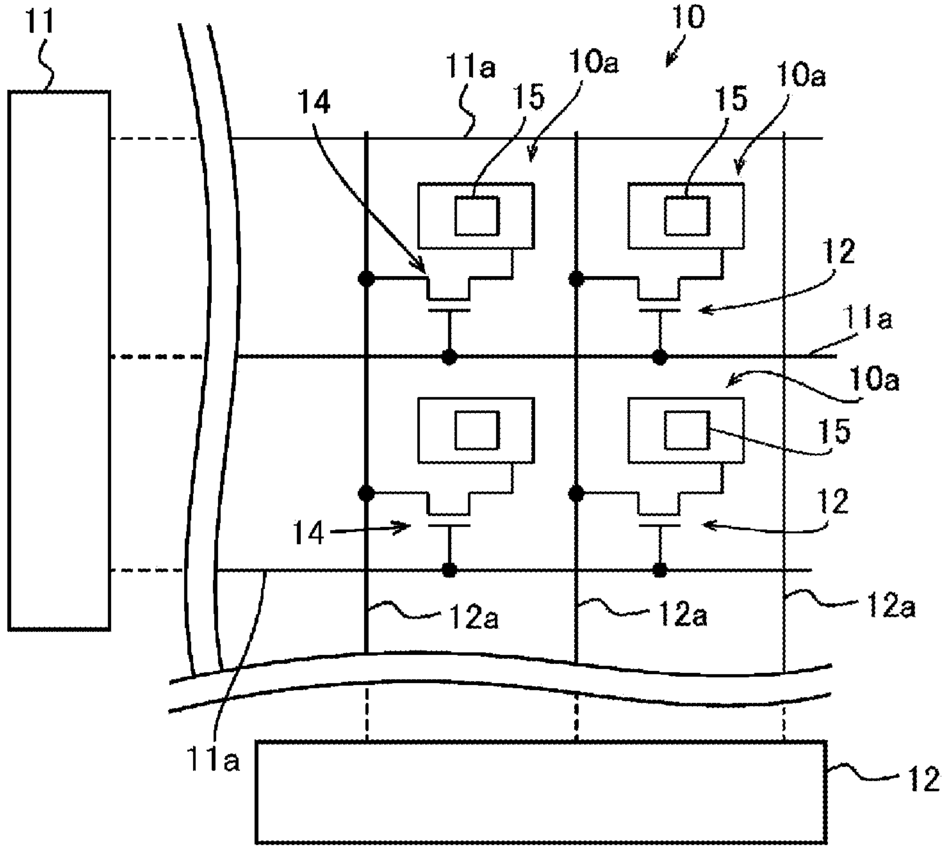
FIG. 3 schematically illustrates a configuration of pixels in the display panel.

FIG. 3 schematically illustrates the configuration of the pixels 10*a* on the display panel 1. Referring to FIG. 3, the pixels 10*a* are formed in a region delineated by the gate lines 11*a* and the source lines 12*a*. The pixel 10*a* includes a thin-film transistor 14 and a pixel electrode 15. The gate line 11*a* is connected to the gate electrode of the thin-film transistor 14. The source line 12*a* is connected to the source electrode of the thin-film transistor 14. The pixel electrode 15 is connected to the drain electrode of the thin-film transistor 14. When the gate electrode of the thin-film transistor 14 is supplied with a gate signal from the gate line 11*a*, the pixel electrode 15 is supplied with a source signal and is charged (thus with an image written on the pixel electrode 15).

Configuration of Timing Control Circuit

Referring to FIG. 1, the timing control circuit 2 receives the control signal D1 and the image signal A1 from the host controller 102. The timing control circuit 2 supplies the display panel 1 with the image signal A1 and the level shifter circuit 3 with a timing signal C1. For example, the timing control circuit 2 may be an integrated circuit.

Figure 4:
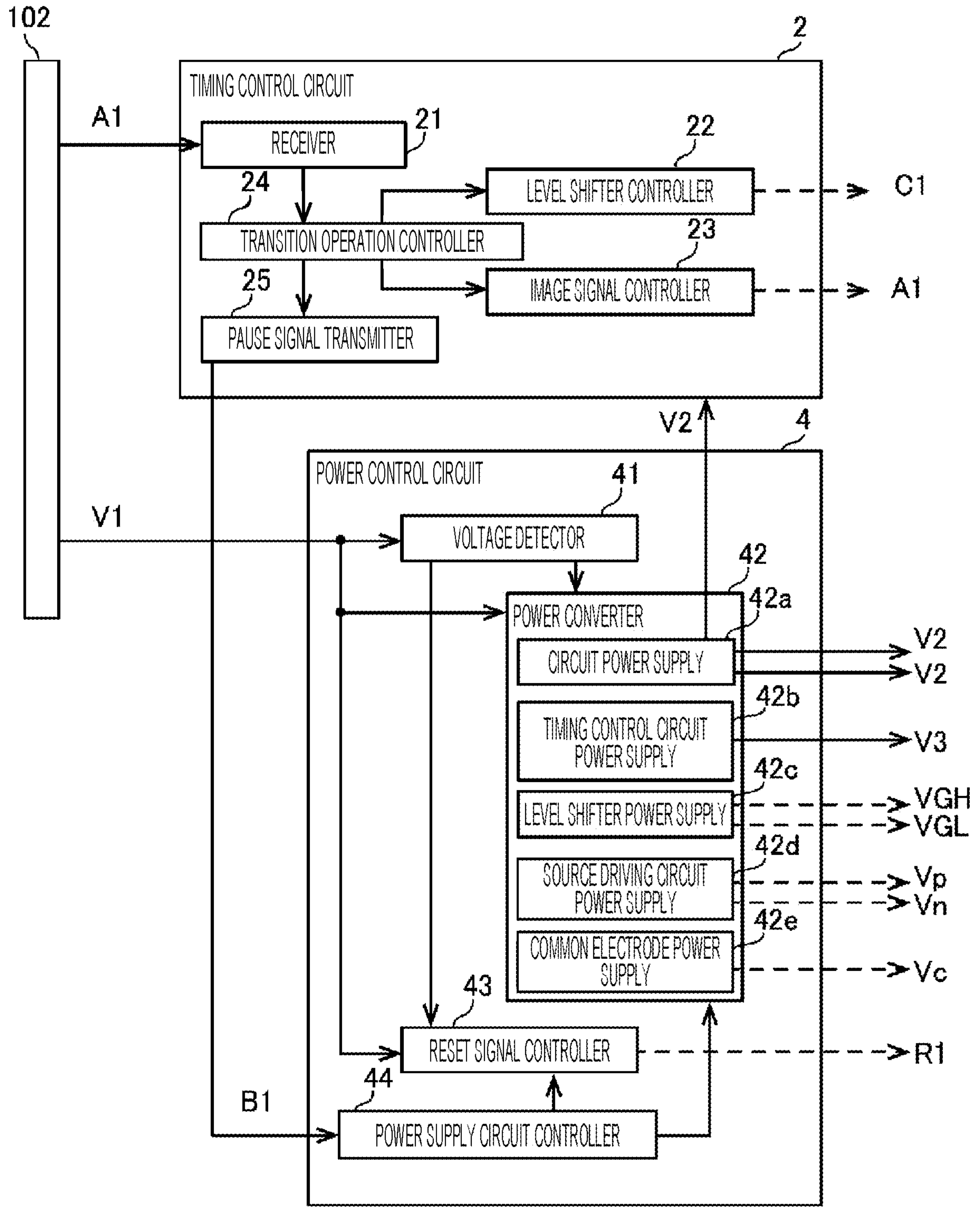
FIG. 4 is a functional block diagram of a timing control circuit and a power control circuit.

FIG. 4 is the functional block diagram of the timing control circuit 2 and the power control circuit 4. Referring to FIG. 4, the timing control circuit 2 includes a receiver 21, a level shifter controller 22, an image signal controller 23, a transition operation controller 24 and a pause signal transmitter 25. The receiver 21 receives the image signal A1 and the control signal D1 from the host controller 102. The level shifter controller 22 transmits the timing signal C1 to the level shifter circuit 3 in response to the image signal A1. The timing signal C1 includes a synchronization signal (such as a vertical synchronization signal) and a clock signal. The image signal controller 23 transmits the image signal A1 to the source driving circuit 12 in the display panel 1.

When the receiver 21 receives the control signal D1 including a signal used to transition from the display mode to the pause mode, the transition operation controller 24 causes the level shifter controller 22 and the image signal controller 23 to stop operating. The supply of the timing signal C1 from the level shifter controller 22 is thus stopped. Stopping the supply of the timing signal C1 causes the gate driving circuit 11 to stop outputting the gate signal. The image signal controller 23 stops supplying the image signal A1. The source driving circuit 12 thus stops outputting the source signal. The transition operation controller 24 transmits to the pause signal transmitter 25 a signal that commands the pause signal transmitter 25 to transmit the pause signal B1.

When the receiver 21 receives the control signal D1 including a signal used to transition from the pause mode to the display mode, the transition operation controller 24 causes the level shifter controller 22 and the image signal controller 23 to start operating (resume operation). The level shifter controller 22 thus starts supplying the timing signal C1. The start of supplying the timing signal C1 causes the gate driving circuit 11 to start outputting the gate signal. The image signal controller 23 also starts supplying the image signal A1. The source driving circuit 12 starts outputting the source signal. The transition operation controller 24 transmits to the pause signal transmitter 25 a signal that commands the pause signal transmitter 25 to stop transmitting the pause signal B1.

In response to the command from the transition operation controller 24, the pause signal transmitter 25 transmits the pause signal B1 to the power control circuit 4. For example, the pause signal transmitter 25 transmits the pause signal B1 by transitioning to a high level the level of a voltage applied to a signal line connected to the power control circuit 4. In response to the command from the transition operation controller 24, the pause signal transmitter 25 stops transmitting the pause signal B1 by transitioning to a low level the level of the voltage applied to the signal line connected to the power control circuit 4.

Configuration of Level Shifter Circuit

The level shifter circuit 3 generates the gate signal G1 responsive to the timing signal C1 from the timing control circuit 2 in the display mode using voltages VGH and VGL supplied from the power control circuit 4. Via the gate driving circuit 11, the level shifter circuit 3 successively transmits to the gate lines 11*a* the pulse-shaped gate signal G1 at the voltage VGH. The level shifter circuit 3 also supplies the voltage VGL to gate lines 11*a* excluding the gate lines 11*a* that are currently supplied with the gate signal G1.

Configuration of Power Control Circuit

The power control circuit 4 controls a power-on state and a power-off state of each of the display panel 1, the timing control circuit 2 and the level shifter circuit 3. Referring to FIG. 4, the power control circuit 4 includes a voltage detector 41, a power converter 42, a reset signal controller 43 and a power supply circuit controller 44.

The voltage detector 41 detects a voltage V1 (at a high voltage level) supplied by the host controller 102. When the host controller 102 stops supplying the voltage V1 (with the voltage level transitioned to a low level), the voltage detector 41 causes the reset signal controller 43 to stop outputting the reset signal R1. When the host controller 102 stops supplying the voltage V1, the voltage detector 41 also causes the power converter 42 to stop outputting voltages. For example, the supply of the voltage V1 from the host controller 102 is stopped when the display system 100 is powered off and the host controller 102 is thus powered off.

The power converter 42 includes a circuit power supply 42*a*, a timing control circuit power supply 42*b*, a level shifter power supply 42*c*, a source driving circuit power supply 42*d* and a common electrode power supply 42*e*. The circuit power supply 42*a* converts the voltage V1 output from the host controller 102 to a voltage V2 that is used to operate the display panel 1, the timing control circuit 2 and the level shifter circuit 3. The circuit power supply 42*a* outputs the voltage V2 to the display panel 1, the timing control circuit 2 and the level shifter circuit 3. For example, the voltage V1 is 3.3 V and the voltage V2 is 1.8 V.

The timing control circuit power supply 42*b* converts the voltage V1 output from the host controller 102 into a voltage V3 used to operate the timing control circuit 2. The timing control circuit power supply 42*b* outputs the voltage V3 to the timing control circuit 2. The voltage V3 is different in voltage value from the voltage V2.

The level shifter power supply 42*c* converts the voltage V1 output from the host controller 102 into the voltages VGH and VGL that the level shifter circuit 3 uses to generate the gate signal G1. The level shifter power supply 42*c* outputs the voltages VGH and VGL to the level shifter circuit 3.

The source driving circuit power supply 42*d* converts the voltage V1 output from the host controller 102 into the positive voltage Vp and the negative voltage Vn that the source driving circuit 12 uses to generate the source signal. The source driving circuit power supply 42*d* outputs the positive voltage Vp and the negative voltage Vn to the source driving circuit 12.

The common electrode power supply 42*e* converts the voltage V1 output from the host controller 102 into a voltage Vc that is supplied to the common electrode of the display panel 1. The common electrode power supply 42*e* outputs the voltage Vc to the display panel 1.

The reset signal controller 43 outputs the reset signal R1 in response to a command from the voltage detector 41. When the reset signal R1 transitions to a low voltage level (off) from a high voltage level, the level shifter circuit 3 and the source driving circuit 12 stop operating. Specifically, the level shifter circuit 3 (the gate driving circuit 11) outputs the gate signal with the reset signal R1 at a high voltage level while stopping outputting the gate signal with the reset signal R1 at a low voltage level. The source driving circuit 12 outputs the source signal with the reset signal R1 at a high voltage level and while stopping outputting the source signal with the reset signal R1 at a low voltage level.

With the pause signal B1 received from the timing control circuit 2, the power supply circuit controller 44 causes the level shifter power supply 42*c*, the source driving circuit power supply 42*d* and the common electrode power supply 42*e* to stop supplying power while allowing the circuit power supply 42*a* and the timing control circuit power supply 42*b* in the power converter 42 to continuously supply power. In this way, the level shifter circuit 3, not supplied with power from the level shifter power supply 42*c*, stops the operation thereof (thus stopping outputting the gate signal). The supply of power to the common electrode in the display panel 1 is also stopped. The source driving circuit 12, not supplied with power by the level shifter power supply 42*c*, stops the operation thereof (thus stopping outputting the source signal). The supply of power to timing control circuit 2 is maintained. Time to start up the timing control circuit 2 may be saved between when the control signal D1 including the signal used to transition from the pause mode to the display mode is received and when the display panel 1 displays images. As a result, a period of time from when the control signal D1 used to transition from the pause mode to the display mode is received until when the display panel 1 displays images may be reduced.

Operation of Display System

Figure 5:
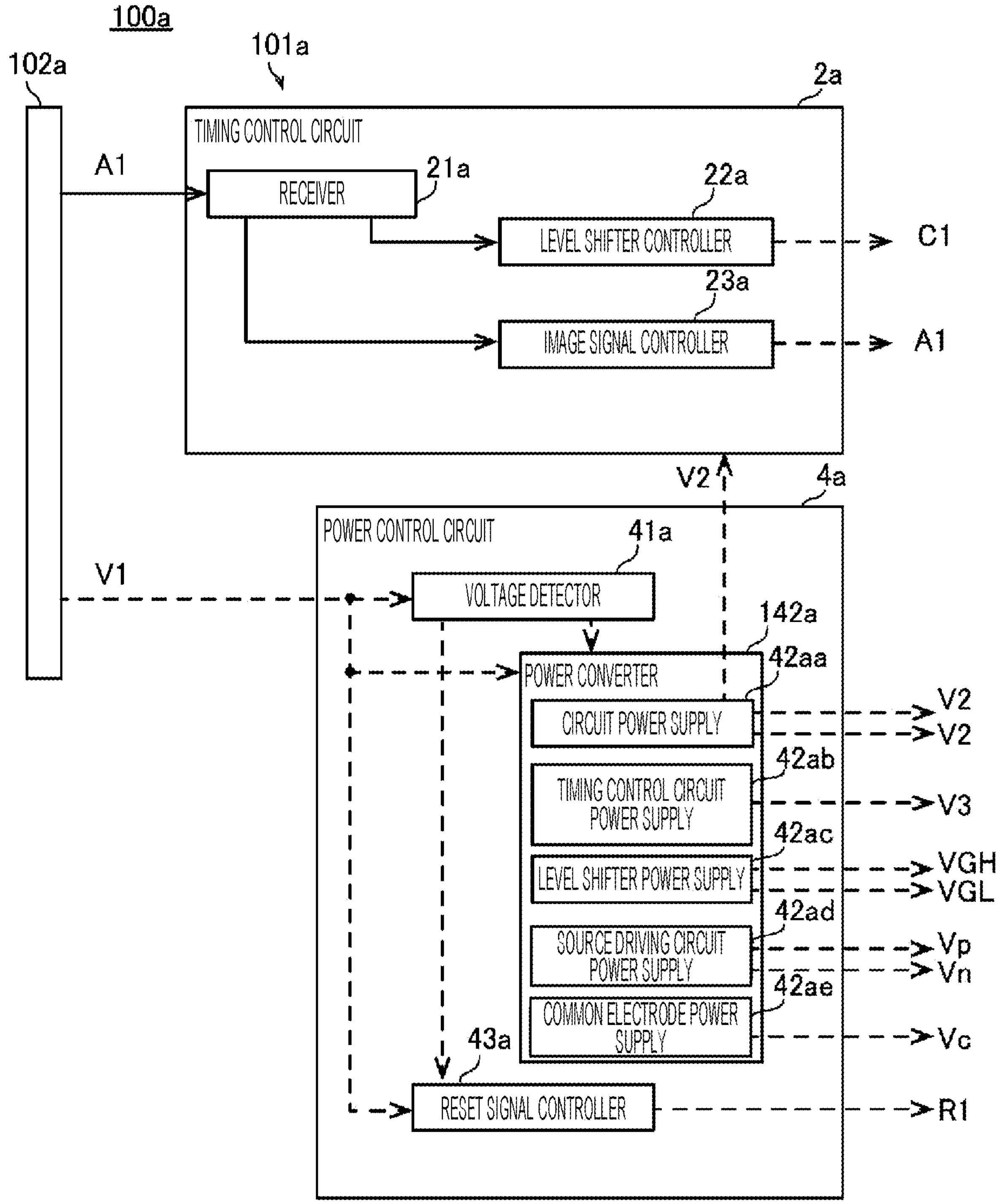
FIG. 5 is a functional block diagram of a display system serving as a comparative example.
Figure 6:
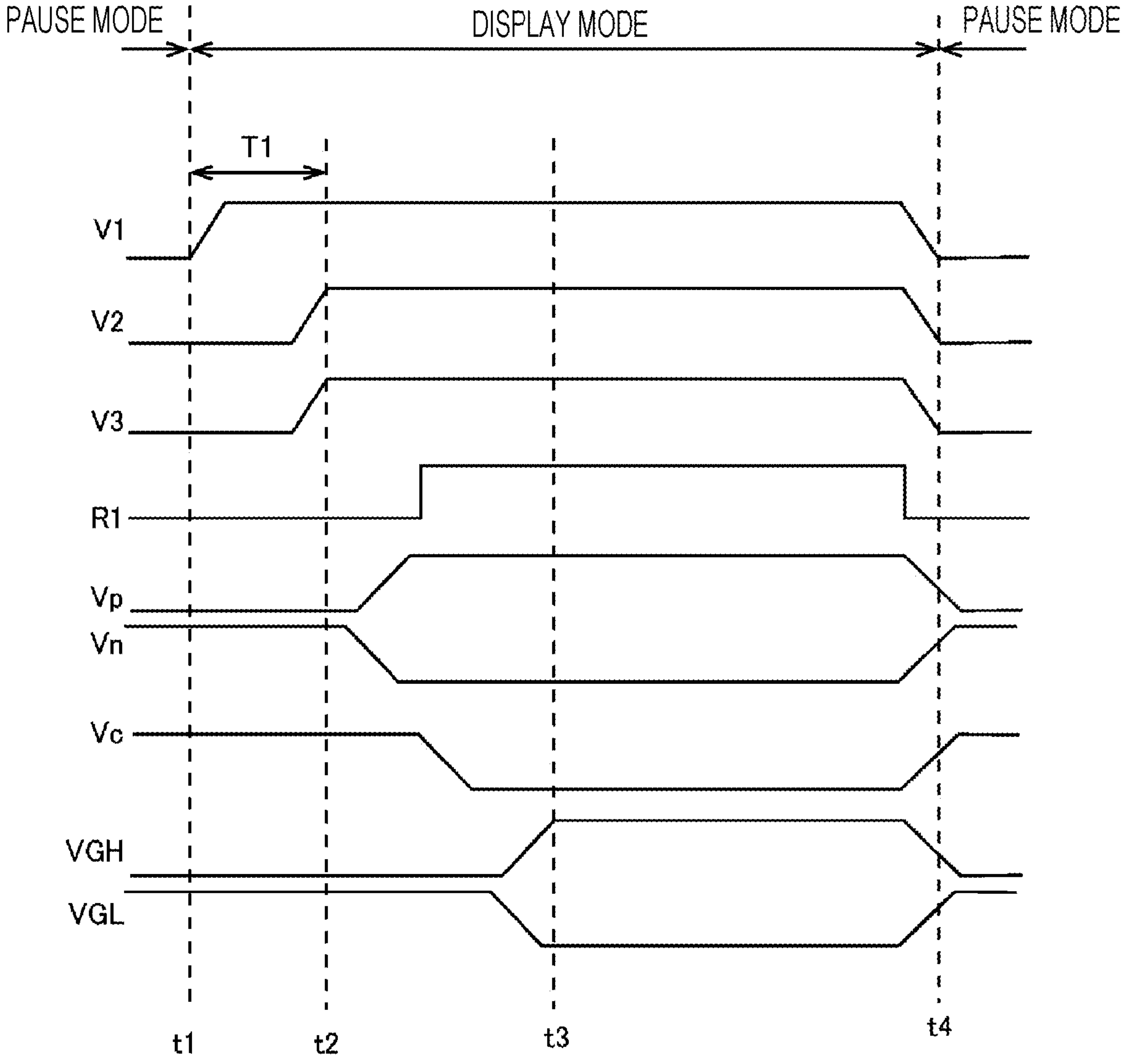
FIG. 6 is a timing diagram illustrating an operation of the display system serving as the comparative example.

Operation of the display system 100 of the first embodiment is described in comparison with a display system 100*a* as a comparative example. FIG. 5 is a functional block diagram of a configuration of the display system 100*a* as the comparative example. FIG. 6 is a timing diagram illustrating the operation of the display system 100*a*.

Comparative Example

Referring to FIG. 5, the display system 100*a* includes a display apparatus 101*a* and a host controller 102*a*. A receiver 21*a* in a timing control circuit 2*a* receives the image signal A1 from the host controller 102*a*. A level shifter controller 22*a* in the timing control circuit 2*a* outputs the timing signal C1 in response to the image signal A1. An image signal controller 23*a* in the timing control circuit 2*a* outputs the image signal A1 to the source driving circuit.

When the mode is transitioned from the display mode to the pause mode, the host controller 102*a* stops supplying the voltage V1 to a power control circuit 4*a*. When the supply of the voltage V1 to a voltage detector 41*a* is stopped, the voltage detector 41*a* in the power control circuit 4*a* causes a power converter 142*a* to stop operating and thus causes a reset signal controller 43*a* to stop outputting the reset signal R1 (thus transitioning the voltage of the reset signal R1 to a low level). In the comparative example in the pause mode, the supply of power to the timing control circuit 2*a*, the level shifter circuit and the display panel is thus stopped.

When the mode is transitioned from the pause mode to the display mode, the host controller 102*a* starts supplying the voltage V1 to the power control circuit 4*a* at time t1 as illustrated in FIG. 6. The power control circuit 4*a* starts up and then the outputting of the voltages V2 and V3 starts after the elapse of a time duration of T1 from time t1. Then the timing control circuit 2*a* starts up. The outputting of the voltages Vp, Vn, Vc, VGH and VGL and the reset signal R1 starts and at time t3, the display panel starts displaying images.

Operation of First Embodiment

Figure 7:
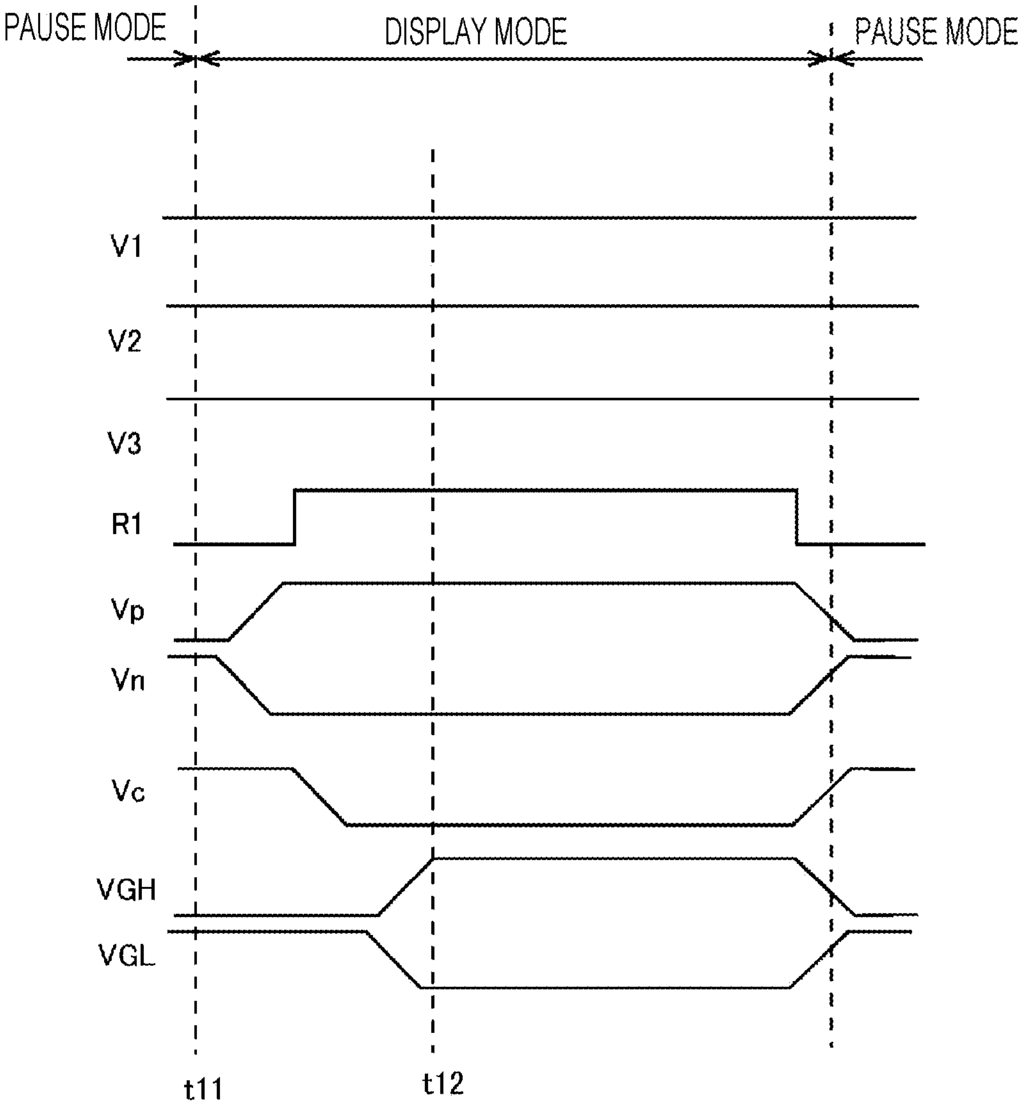
FIG. 7 is a timing diagram illustrating an operation of a display system of a first embodiment.

In the first embodiment in contrast with the comparative example, the host controller 102 supplies the voltage V1 to the power control circuit 4 in both the pause mode and the display mode as illustrated in FIG. 7. When the mode is transitioned from the pause mode to the display mode, the host controller 102 transmits to the timing control circuit 2 the control signal D1 including the signal used to transition from the pause mode to the display mode. The timing control circuit 2 starts supplying the timing signal C1 to the level shifter circuit 3 and the image signal A1 to the source driving circuit 12.

The timing control circuit 2 stops supplying the pause signal B1 to the power control circuit 4 at time t11. Since the power control circuit 4 supplied with the voltage V1 continues outputting the voltages V2 and V3 in the pause mode, the voltages V2 and V3 still continues to be output at time t11. The power control circuit 4 supplied with the voltage V1 starts outputting the voltages Vp, Vn, Vc, VGH and VGL and the reset signal R1 after time t11 and the display panel 1 starts the displaying operation at time t12. According to the first embodiment, the display panel 1 may start the displaying operation within a period of time that starts from the time of transition from the pause mode to the display mode and is shorter than the corresponding period of time in the comparative example by a time duration T1.

Second Embodiment

The configuration of a display system 200 of a second embodiment is described with reference to FIG. 8. In the first embodiment, the pause signal B1 is transmitted by transitioning a single signal line to a high voltage level or a low voltage level. In the second embodiment, the pause signal B1 is transmitted in response to a command. The same elements identical to those in the first embodiment are designated with the same reference numerals and the discussion thereof is omitted herein.

Figure 8:
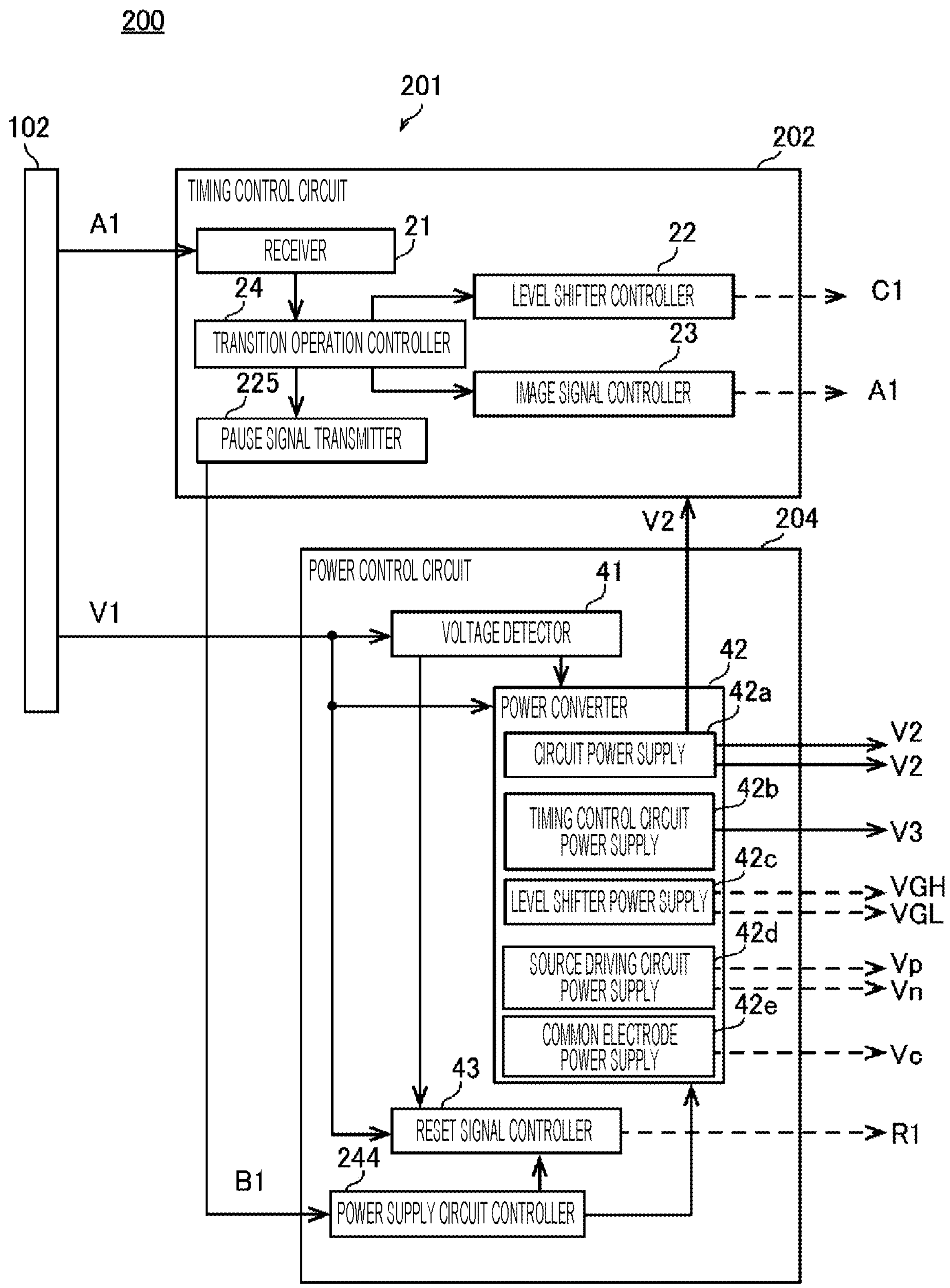
FIG. 8 is a block diagram illustrating a configuration of a display system of a second embodiment.

Referring to FIG. 8, the display system 200 includes a display apparatus 201. The display apparatus 201 includes a timing control circuit 202 and a power control circuit 204. In the second embodiment, the timing control circuit 202 is connected to the power control circuit 204 via an I2C bus and performs serial communication with the power control circuit 204. A pause signal transmitter 225 in the timing control circuit 202 transmits the pause signal B1 as a command in the serial communication. In response to the reception of a command, a power supply circuit controller 244 in the power control circuit 204 causes the level shifter power supply 42*c*, the source driving circuit power supply 42*d* and the common electrode power supply 42*e* to stop supplying power while keeping the circuit power supply 42*a* and the timing control circuit power supply 42*b* in the power converter 42 supplying power. The rest of the configuration and effects of the second embodiment remains unchanged from the configuration and effects of the first embodiment.

Third Embodiment

Figure 9:
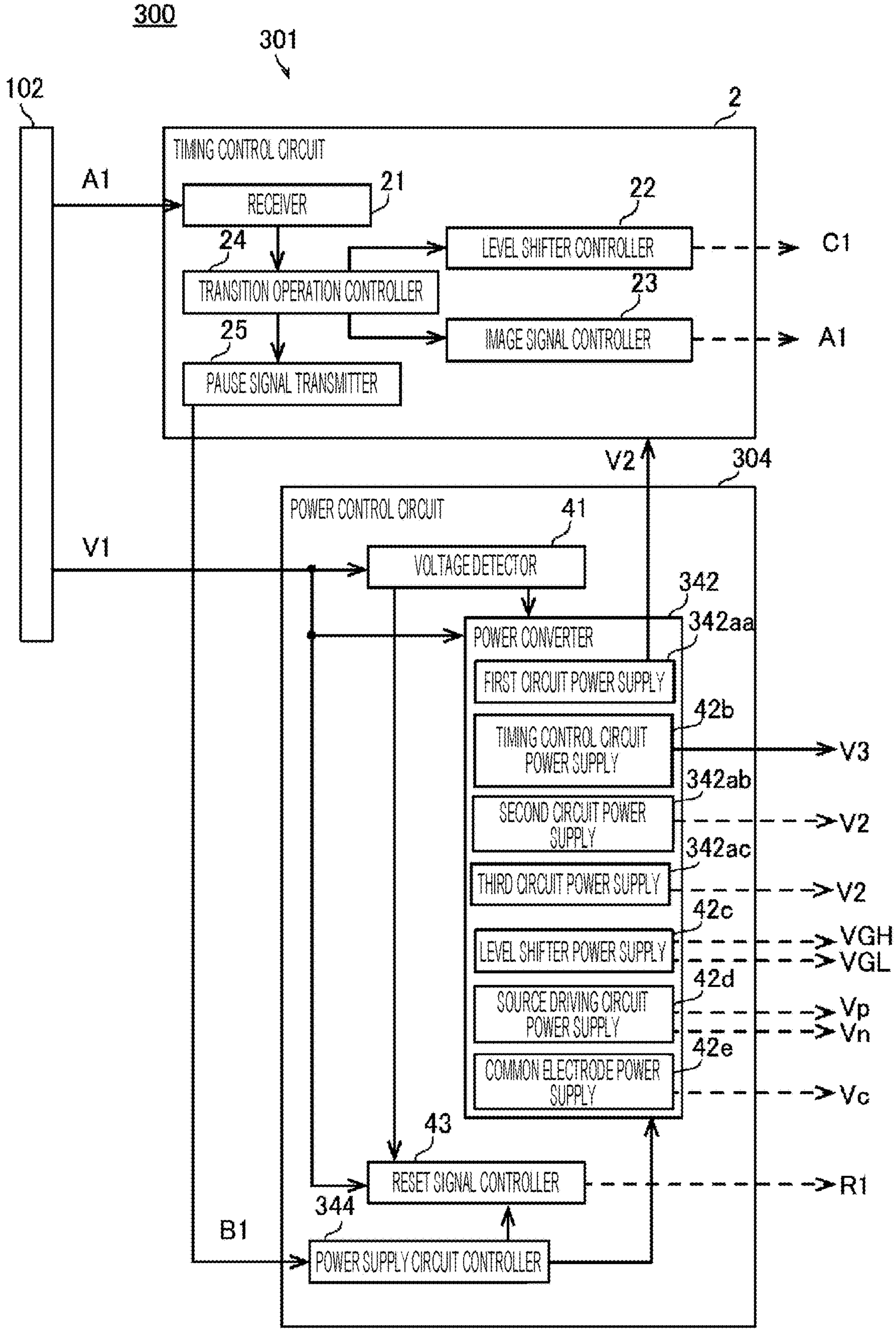
FIG. 9 is a block diagram illustrating a configuration of a display system of a third embodiment.

Referring to FIG. 9, the configuration of a display system 300 of a third embodiment is described below. According to the third embodiment, in response to the reception of the pause signal B1, the power control circuit 204 continues to supplying power to the timing control circuit 2 but stops supplying power to the display panel 1, the level shifter circuit 3 and the source driving circuit 12. Elements of the third embodiment identical to the elements of the first embodiment are designated with the same reference numerals and the discussion thereof is omitted herein.

As illustrated in FIG. 9, the display system 300 includes a display apparatus 301. The display apparatus 301 includes a power control circuit 304. The power control circuit 304 includes a power converter 342 and a power supply circuit controller 344. The power converter 342 of the third embodiment includes a first circuit power supply 342*aa*, a second circuit power supply 342*ab* and a third circuit power supply 342*ac*.

The first circuit power supply 342*aa* is connected to the timing control circuit 2 and supplies the voltage V2 to the timing control circuit 2 in both the display mode and the pause mode. The second circuit power supply 342*ab* is connected to the level shifter circuit 3 (see FIG. 1) and supplies the voltage V2 to the level shifter circuit 3 in the display mode while stopping supplying power the voltage V2 to the level shifter circuit 3 in the pause mode. The third circuit power supply 342*ac* is connected to the source driving circuit 12 (see FIG. 1) and supplies the voltage V2 to the source driving circuit 12 in the display mode while stopping supplying the voltage V2 to the source driving circuit 12 in the pause mode.

In response to the reception of the pause signal B1 from the timing control circuit 2, the power supply circuit controller 344 causes the second circuit power supply 342*ab*, the third circuit power supply 342*ac*, the level shifter power supply 42*c*, the source driving circuit power supply 42*d* and the common electrode power supply 42*e* to stop supplying power while keeping the first circuit power supply 342*aa* and the timing control circuit power supply 42*b* supplying power. The power control circuit 304 stops supplying power to the display panel 1, the level shifter circuit 3 and the source driving circuit 12 while keeping supplying power to the timing control circuit 2. In this way, the supply of power to the display panel 1, the level shifter circuit 3 and the source driving circuit 12 is stopped and power consumption in the pause mode may be reduced.

Modifications

The embodiments of the disclosure have been described for exemplary purposes only. The disclosure is not limited to the embodiments and the embodiments may be modified without departing from the scope of the disclosure. Modifications of the embodiments are described below.

(1) According to the first through third embodiments, the host controller supplies the voltage V1 to the power control circuit. The disclosure is not limited to this method. A power supply circuit other than the host controller may supply the voltage V1 to the power control circuit.

(2) According to the first through third embodiments, the display panel includes the gate driver monolithic (GDM) circuit. The disclosure is not limited to this configuration. For example, an integrated circuit (gate driver) including a level shifter circuit may be mounted on the substrate.

(3) According to the first through third embodiments, the display driving circuit includes the level shifter circuit. The disclosure is not limited to this configuration. The display driving circuit may not include the level shifter circuit but may include a driving circuit in which the gate signal is successively supplied to multiple gate lines.

The configurations described above may also be described as below.

According to a first configuration, there is provided a display apparatus including: a display panel; a display driving circuit that supplies the display panel with a driving signal; a timing control circuit that supplies the display panel with an image signal and the display driving circuit with a timing signal; and a power control circuit that controls a power-on state and a power-off state on each of the display panel, the display driving circuit and the timing control circuit, wherein in response to reception of a control signal from a host controller with the control signal used to transition the display panel from a display mode causing the display panel to perform displaying to a pause mode causing the display panel to stop displaying, the timing control circuit transmits a pause signal to the power control circuit, and causes the display driving circuit to stop supplying the driving signal to the display panel by stopping supplying the timing signal to the display driving circuit, wherein in response to reception of the pause signal, the power control circuit stops supplying at least part of power to be supplied to the display panel and the display driving circuit while keeping supplying power to the timing control circuit, and wherein in response to reception of a control signal used to transition from the display mode to the pause mode from the host controller, the timing control circuit stops transmitting the pause signal to the power control circuit and supplies the display driving circuit with the timing signal (first configuration).

According to the first configuration, the supply of power to the timing control circuit is maintained while the display panel stops displaying. Time to start up the timing control circuit may be saved between when the control signal used to transition from the pause mode to the display mode is received and when the display panel stops displaying. As a result, a period of time from when the control signal used to transition from the pause mode to the display mode is received until when the display panel displays an image may be reduced.

In the first configuration, the power control circuit may include a first power supply circuit supplying power at a first voltage to the timing control circuit, the display panel and the display driving circuit, a second power supply circuit supplying power at a second voltage to the display panel and a third power supply circuit supplying power at a third voltage to the display driving circuit. In response to the reception of the pause signal, the power control circuit may cause the second power supply circuit and the third power supply circuit to stop supplying power while keeping the first power supply circuit supplying power (second configuration).

In the second configuration, the second power supply circuit and the third power supply circuit stop supplying power while the first power supply circuit supplies power to the timing control circuit. The supply of part of the power to be supplied to the display panel and the display driving circuit may be stopped while the supply of power to the timing control circuit is maintained.

In the first configuration, the power control circuit may be configured such that in response to the reception of the pause signal, the power control circuit stops supplying power to the display panel and the display driving circuit while keeping supplying power to the timing control circuit (third configuration).

According to the third configuration, power consumption may be reduced since the supply of power to the display panel and the display driving circuit is suspended in the pause mode.

According to a fourth configuration, there is provided a display system including: a display apparatus including a display panel; and a host controller that transmits a first control signal and a second control signal to the display apparatus with the first control signal used to transition the display panel from a display mode causing the display panel to perform displaying to a pause mode causing the display panel to stop displaying and with the second control signal used to transition the display panel from the pause mode to the display mode; wherein the display apparatus includes: a display driving circuit that supplies the display panel with a driving signal; a timing control circuit that supplies the display panel with an image signal and the display driving circuit with a timing signal; and a power control circuit that controls a power-on state and a power-off state on each of the display panel, the display driving circuit and the timing control circuit, wherein the timing control circuit receives the first control signal from the host controller, transmits a pause signal to the power control circuit, and causes the display driving circuit to stop supplying the driving signal to the display panel by stopping supplying the timing signal to the display driving circuit, wherein in response to reception of the pause signal, the power control circuit stops supplying at least part of power to be supplied to the display panel and the display driving circuit while keeping supplying power to the timing control circuit, and wherein in response to reception of the second control signal from the host controller, the timing control circuit stops transmitting the pause signal to the power control circuit and supplies the display driving circuit with the timing signal (fourth configuration).

According to the fourth configuration, the display system thus provided may reduce a period of time from when the control signal used to transition from the pause mode to the display mode is received until when the display panel displays an image.

The present disclosure contains subject matter related to that disclosed in Japanese Priority Patent Application JP 2023-119440 filed in the Japan Patent Office on Jul. 21, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:

a display panel including a common electrode and a gate line;

a display driving circuit that supplies the gate line of the display panel with a driving signal;

a timing control circuit that supplies the display panel with an image signal and the display driving circuit with a timing signal; and a power control circuit that controls a power-on state and a power-off state on each of the display panel, the display driving circuit, and the timing control circuit, wherein in response to reception of a control signal from a host controller, with the control signal used to transition the display panel from a display mode, that causes the display panel to perform displaying, to a pause mode, that causes the display panel to stop displaying, the timing control circuit:

transmits a pause signal to the power control circuit, and causes the display driving circuit to stop supplying the driving signal to the display panel by stopping supplying the timing signal to the display driving circuit, wherein the power control circuit comprises:

a timing control circuit power supply unit outputting a voltage to the timing control circuit;

a display driving circuit power supply unit outputting a voltage to the display driving circuit; and a common electrode power supply unit outputting a voltage to the common electrode, wherein in response to reception of the pause signal, the power control circuit stops the output of the voltage from the display driving circuit power supply unit and the voltage from the common electrode power supply unit while maintaining the output of the voltage from the timing control circuit power supply unit, and wherein in response to the reception of a control signal used to transition from the pause mode to the display mode from the host controller, the timing control circuit:

stops transmitting the pause signal to the power control circuit, and supplies the display driving circuit with the timing signal.

2. A display system comprising:

a display apparatus including a display panel having a common electrode and a gate line; and a host controller that transmits a first control signal and a second control signal to the display apparatus, with the first control signal used to transition the display panel from a display mode, that causes the display panel to perform displaying, to a pause mode, that causes the display panel to stop displaying, and with the second control signal used to transition the display panel from the pause mode to the display mode, wherein the display apparatus includes:

a display driving circuit that supplies the gate line of the display panel with a driving signal;

a timing control circuit that supplies the display panel with an image signal and the display driving circuit with a timing signal; and a power control circuit that controls a power-on state and a power-off state on each of the display panel, the display driving circuit, and the timing control circuit, wherein the timing control circuit:

receives the first control signal from the host controller, transmits the pause signal to the power control circuit, and causes the display driving circuit to stop supplying the driving signal to the display panel by stopping supplying the timing signal to the display driving circuit, wherein the power control circuit comprises:

a timing control circuit power supply unit outputting a voltage to the timing control circuit;

a display driving circuit power supply unit outputting a voltage to the display driving circuit; and a common electrode power supply unit outputting a voltage to the common electrode, wherein in response to reception of the pause signal, the power control circuit stops the output of the voltage from the display driving circuit power supply unit and the voltage from the common electrode power supply unit while maintaining the output of the voltage from supplying power to the timing control circuit power supply unit, and wherein in response to reception of the second control signal from the host controller, the timing control circuit:

stops transmitting the pause signal to the power control circuit, and supplies the display driving circuit with the timing signal.

* * * * *